United States Patent Office 3,492,333
Patented Jan. 27, 1970

3,492,333
CARBAMIDOXIMES
Karlfried Dickore, Leverkusen, Klaus Sasse and Ludwig Eue, Cologne Stammheim, and Helmuth Hack, Cologne-Buchheim, Germany, assignors to Farbenfabriken Bayer Aktiengesellschaft, Leverkusen, Germany, a corporation of Germany
No Drawing. Filed Oct. 21, 1966, Ser. No. 588,285
Claims priority, application Germany, Oct. 28, 1965,
F 47,537
Int. Cl. C07c 131/00; A01n 9/20
U.S. Cl. 260—472
10 Claims

ABSTRACT OF THE DISCLOSURE

N-substituted carbamide-dihalo-benzaldoximes which possess herbicidal properties and which may be produced by conventional methods.

---

The present invention relates to particular new carbamidoximes which have valuable herbicidal properties, to their compositions with dispersible carrier vehicles, and to methods for their production and use.

It has already been disclosed that carbamidoxime derivatives can be employed for the control of undesirable plant growth. Thus, it is known to employ the carbamidoximes derived from acetone, methyl ethyl ketone, pyridine-2-aldehyde and 2-chlorobenzaldehyde as herbicides (cf. German published specification No. 1,024,746). It is also known to employ the carbamidoximes of 2,6-dichlorobenzaldehyde and its ring substituted derivatives as herbicides (cf. German published specification No. 1,174,-757).

It is an object of the present invention to provide particular new carbamidoximes, and more specifically N-substituted carbamide-dihalo-benzaldoximes, which possess valuable, and especially selective, herbicidal properties; to provide active compositions in the form of mixtures of such compounds with solid and liquid dispersible carrier vehicles; to provide a process for producing such compounds; and to provide methods of using such compounds in a new way, especially for combating weeds, undesired plants, and the like.

Other and further objects of the present invention will become apparent from a study of the within specification and accompanying examples.

It has now been found, in accordance with the present invention, that the particular new N-substituted carbamide-dihalo-benzaldoximes having the general formula:

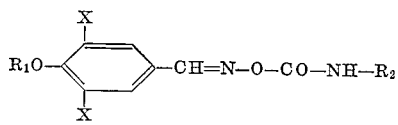

(I)

in which each X respectively is selected from the group consisting of chloro, bromo and iodo, $R_1$ is selected from the group consisting of hydrogen, —$COR_3$ and —$CONHR_3$, and $R_2$ and $R_3$ each respectively is selected from the group consisting of alkyl having 1 to 4 carbon atoms, phenyl, and substituted phenyl which is substituted with a substituent selected from the group consisting of halo, nitro, alkyl having 1 to 4 carbon atoms, alkoxy having 1 to 4 carbon atoms, and mixtures of such substituents, exhibit favorable herbicidal properties.

It has been further found in accordance with the present invention that a process for the production of the particular new carbamidoximes of Formula I above, in a smooth manner and in favorable yields, may be provided, which comprises (a) reacting oximes of 4-(substituted) oxy-3,5-dihalogeno-benzaldehyde of the formula

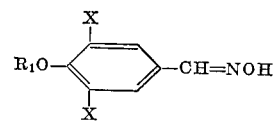

(IIa)

with isocyanates of the formula $$O=C=N-R_2 \quad (IIb)$$

in which X, $R_1$ and $R_2$ are the same as defined above, or (b) reacting carbamidoximes of the formula

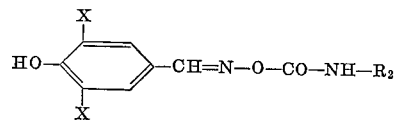

(IIc)

with isocyanates of the formula $$R_3NCO \quad (IId)$$

in the presence of tertiary bases, or with carboxylic acid halides of the formula $$R_3CO—Hal \quad (IIe)$$

or with carboxylic acid anhydrides of the formula $$R_3COOCOR_3 \quad (IIf)$$

in which X, $R_1$, $R_2$ and $R_3$ are the same as defined above and Hal represents halogen such as chlorine, bromine, iodine and fluorine, especially chlorine.

Unexpectedly, the instant novel carbamidoximes not only exhibit a much greater herbicidal potential as compared with the carbamidoxime derivatives hitherto known in the art, but also an appreciably more marked selectivity among cultivated plants, particularly in cereals. The particular new compounds of the present invention therefore provide a significant technical advance over the prior art.

As an example of a reaction according to (a) above, 3,5-dibromo-4-hydroxy-benzaldoxime may be reacted with phenyl isocyanate, with the reaction being represented by the following equation:

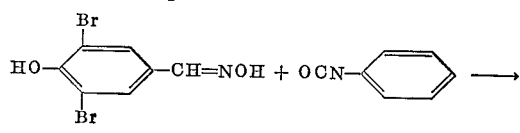

(IIaa)     (IIbb)

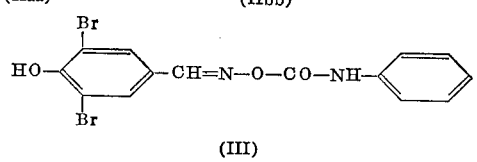

(III)

The following may be mentioned as examples of the starting 3,5-dihalogeno-4-hydroxy-benzeldoximes which may be employed under reaction (a) above according to the present invention as covered by Formula IIa: 3,5-dichloro-4-hydroxy-benzaldoxime; 3,5-dibromo-4-hydroxy-benzaldoxime; 3,5-diiodo-4-hydroxy-benzaldoxime; 3,5-dibromo-4-acetyloxy-benzaldoxime; 3,5-diiodo-4-benzoyloxy-benzaldoxime; 3,5-dibromo-4-(N-phenyl-carbamoyloxy)-benzaldoxime; and the like.

The following may be mentioned as individual examples of the starting isocyanates which may be employed according to the present invention as covered by Formula IIb and Formula IId: methyl isocyanate; ethyl isocyanate; propyl isocyanate; phenyl isocyanate; 4-chlorophenyl isocyanate; 3-chlorophenyl isocyanate; 2-chlorophenyl isocyanate; 2,4-dichlorophenyl isocyanate; 3,4-dichlorophenyl isocyanate; 3,5-dichlorophenyl isocyanate; 4-methoxyphenyl isocyanate; 4-nitrophenyl isocyanate; 3-nitrophenyl isocyanate; 4-ethoxy-phenyl isocyanate; 4-methylphenyl isocyanate; 2-ethylphenyl isocyanate; and the like.

The following may be mentioned as examples of the starting carbamidoximes under reaction (b) above according to the present invention as covered by Formula IIc: N-phenyl-carbamide-3,5-dibromo-benzaldoxime; N-phenylcarbamide-3,5-diiodo-benzaldoxime; N-(4-chlorophenyl)-carbamide-3,5-diiodo-benzaldoxime; and the like.

The following may be mentioned as individual examples of starting carboxylic acid halides which may be employed under reaction (b) according to the present invention as covered by Formula IIe: acetyl chloride, propionyl chloride, butyryl chloride, and the like.

The following may be mentioned as individual examples of starting acid anhydrides which may be employed under reaction (b) according to the present invention as covered by Formula IIf: acetic anhydride, propionic anhydride, butyric anhydride, and the like.

All inert organic solvents can be considered as suitable diluents for reactions according to (a) and (b) above which involve the use of isocyanates (e.g., Formulate IIb and IId). These include in particular hydrocarbons such as benzine, toluene and xylene, ethers such as diethyl ether, dioxan or tetrahydrofuran and chlorinated hydrocarbons such as methylene chloride, chloroform or carbon tetrachloride, and the like.

In addition to the above mentioned organic solvents, water and aqueous alkali metal hydroxide solutions, e.g., sodium and potassium hydroxide solutions, can be considered especially suitable for reactions according to (b) involving the use of carboxylic acid halides (e.g., Formula IIe).

In addition to the above mentioned organic solvents, an excess of the appropriate carboxylic acid anhydride can be used to provide a suitable diluent for reactions according to (b) involving the use of carboxylic acid anhydrides (e.g., Formula IIf).

In the reaction of the carbamidoximes (e.g., Formula IIc) with isocyanates (e.g., Formula IId), it is appropriate to catalyze the progress of the reaction by the addition of tertiary amines, such as trimethylamine, triethylamine and triethylene diamine, or by means of tin octoate, and the like.

In the reaction of the carbamidoximes (e.g., Formula IIc) with carboxylic acid halides (e.g., Formula IIe), it is appropriate to add the usual acid binding agents such as amines, for instance triethylmine or pyridine, or alkali metal hydroxides, such as sodium hydroxide and potassium hydroxide, and the like, in order to combine with the liberated hydrohalide acid.

The reaction temperatures may be varied within a relatively wide range. In general, the reactions are carried out substantially between about 0° and 100° C., preferably between about 10° and 50° C.

Equimolar proportions of the starting materials are preferably reacted with each other during the execution of the processes according to the instant invention. It is however also possible to employ a relatively large excess of the isocyanates. Thus, for instance when a 4-hydroxy-3,5-dihalogeno-benzaldoxime is reacted with an isocyanate in a molar proportion of 1:1, the products are 4-hydroxy-3,5-dihalogeno-benzaldoxime-carbamates, i.e., with free hydroxyl groups. A catalysis by means of tertiary amines is not required during this reaction. If however, it is still desired also to block the hydroxyl group at the 4-position by means of an isocyanate group, the reaction partners are applied at a molar proportion of 1:2 and tertiary amines, such as triethylamine or triethylene diamine, are employed as catalysts.

Moreover, it is also possible first to react the 4-hydroxy-3,5-dihalogeno-benzaldoxime with an isocyanate in a molar proportion at 1:1 and thereafter to block the free hydroxyl group by the usual method according to Schotten-Baumann with the aid of a reactive carboxylic derivative, such as acetyl chloride, acetic anhydride, butyric anhydride, benzoyl chloride, and the like.

The reaction products of the foregoing reactants may be worked up by the usual methods.

Advantageously, the carbamidoximes of the present invention exhibit strong herbicidal properties and can therefore be employed as active compounds for the destruction of plants. Since their herbicidal activity towards different plants differs markedly, they can be applied most advantageously as selective herbicides.

Thus, they can be employed for weed control in cultivations such as wheat, barley, millet, maize and rice, in other words especially in cereal cultivation. The following may be mentioned as weeds which can be controlled particularly well with the new active agents: Sinapis, Galium, Galinsoga, Stellaria, Urtica, Matricaria, Echinochloa, and the like.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pp. 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.), and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as nonionic and anionic emulsifying agents (for instance, polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, such as phenoxy-carboxylic acids, nitrated phenols, ureas, uracils, triazines and carbamates, if desired.

The substances according to the invention may be employed, therefore, by themselves as the artisan will appreciate, in the form of their compositions with solid or liquid dispersible carrier vehicles and/or other known compatible active agents, or in the form of particular dosage preparations for specific application made therefrom, such as solutions, emulsions, surpensions, powders, pastes, and granulates which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.03 and 2%, preferably 0.01 and 0.8%, by weight of the mixture. Thus, the present invention contemplates over-all compositions which comprise mixtures of a dispersible carrier vehicle such as a dispersible carrier solid, or a dispersible carrier liquid preferably including a carrier vehicle assistant, e.g., a surface-active agent, such as an emulsifying agent and/or a dispersing agent, and an amount of the active compound which is effective for the purpose in question and which is generally between about 0.03 and 95% by weight of the mixture. Specifically, with regard to compositions of the foregoing type, the active compounds may be applied as total herbicides in concentrations substantially between about 0.1 and 2%, preferably 0.2 and 0.8%, by weight, and such compounds may be applied as selective herbicides in concentrations substantially between about 0.01 and 0.2%, preferably 0.03 and 0.1%, by weight, although as the artisan will appreciate, the concentration may be varied within a fairly wide range depending upon weather conditions, the purposes of application and also on the plants to be controlled and those to be protected. However, generally the range of concentration will be between 0.03 and 95% by weight of the mixture as aforesaid.

Furthermore, the present invention contemplates methods of selectively controlling or combating undesired plants, e.g., weeds and the like, which comprise applying to at least one of (a) such weeds and (b) their habitat, a herbicidally effective amount of the particular active compound of the invention alone or together with a carrier vehicle as noted above. The instant formulations or compositions are applied in the usual manner, for example, by spraying, atomizing, scattering, dusting, dispersing, watering, sprinkling, and the like, whether for pre-emergence application to the soil or post-emergence application to the weeds, the instant compounds being particularly effective when used for the latter purpose.

The excellent herbicidal activity of the compounds of the present invention is illustrated, without limitation, by the following examples.

EXAMPLE I

Post-emergence test

Solvent: 5 parts by weight acetone.
Emulsifier: 1 part by weight benzyloxy-polyglycol ether.

To produce a suitable preparation of the particular active compound, 1 part by weight of such active compound is mixed with the stated amount of solvent. The stated amount of emulsifier is then added and the resulting concentrate is diluted with water to the desired final concentration.

Test plants of about 5–15 cm. height are sprayed with the preparation of the given active agent until just dew moist. After three weeks, the degree of damage to the plants is determined and characterized by the values 0–5, which have the following meaning:

0—no effect
1—a few slightly burnt spots
2—marked damage to leaves
3—some leaves and parts of stalks partially dead
4—plant partially destroyed
5—plant completely dead The active agents, their concentrations and the results obtained can be seen from the following Table 1:

TABLE 1

| Active Agent | Concentration of active agent in percent | Post-emergence-test | | | | | | | | | | |
|---|---|---|---|---|---|---|---|---|---|---|---|---|
| | | Rice | Oats | Wheat | Echinochloa | Chenopodium | Sinapis | Vicia | Urtica | Galinsoga | Stellaria | Dauous |
| (A) N-phenylcarbamide-acetone-oxime (known) | 0.2 | 3 | 2–3 | 2 | 4 | 4 | 5 | 3 | 4–5 | 4–5 | 5 | 1 |
| | 0.1 | 2 | 1–2 | 2 | 3–4 | 3 | 5 | 1 | 4 | 2 | 4 | 0 |
| | 0.05 | 0 | 0 | 0–1 | 3 | 3 | 5 | 0 | 2 | 0 | 3 | 0 |
| (B) N-phenylcarbamide-2,6-dichlorobenzaldoxime (known) | 0.2 | 3 | 4 | 3 | 2 | 4–5 | 4 | 2 | 4 | 1 | 2 | 2 |
| | 0.1 | 1 | 3 | 1 | 0 | 4 | 3 | 0 | 2 | 0 | 1 | 1 |
| (C) N-(4'-chlorophenyl)-carbamide-2,6-dichlorobenzaldoxime (known) | 0.2 | 2–3 | 4 | 2 | 4 | 4 | 2 | 2 | 3 | 0 | 3 | 2 |
| | 0.1 | 0 | 3 | 1 | 4 | 3 | 1 | 2 | 1 | 0 | 2 | 0 |
| (IV) 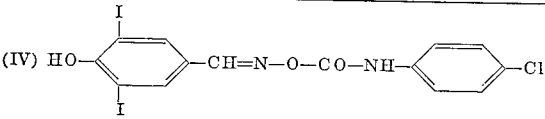 | 0.2 | 3 | 3 | 2 | 5 | 5 | 5 | 5 | 5 | 5 | 5 | 5 |
| | 0.1 | 1 | 1 | 1 | 4 | 5 | 5 | 5 | 5 | 5 | 5 | 5 |
| | 0.05 | 0 | 0 | 0 | 3 | 5 | 5 | 4 | 5 | 5 | 4 | 5 |
| (III') 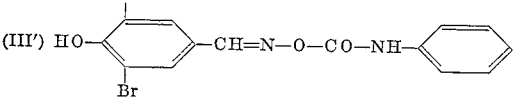 | 0.2 | 2 | 2 | 2 | 4–5 | 5 | 5 | 5 | 5 | 5 | 5 | 3 |
| | 0.1 | 0 | 0 | 1 | 4 | 5 | 5 | 5 | 5 | 5 | 4–5 | 2 |
| | 0.05 | 0 | 0 | 0 | 3 | 5 | 5 | 4 | 5 | 5 | 4 | 1 |

The following exhibit a similar activity to that of the foregoing compounds of the present invention:

(V) 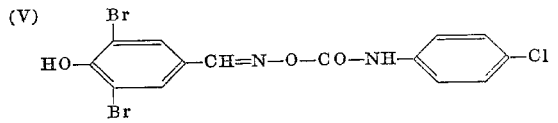

(VI) 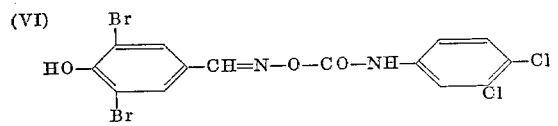

(VII) 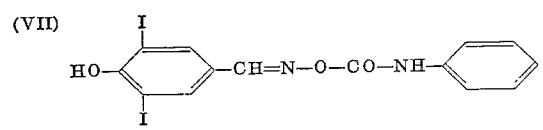

(VIII) 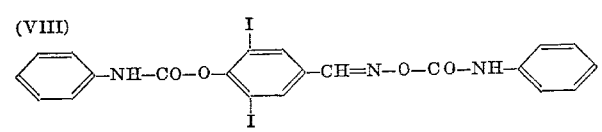

(IX) 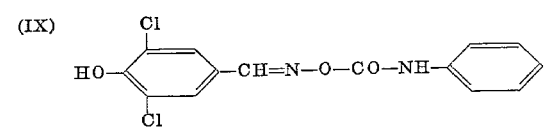

(X) 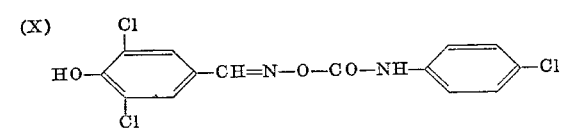

(XI) 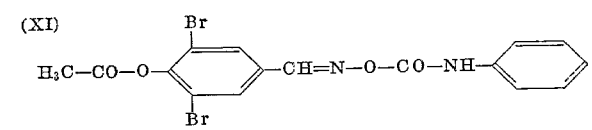

EXAMPLE 2

A mixed plot of Chenopodium, Stellaria, Urtica and Sinapis was treated with a 15% preparation of the active agent N-(3′,4′-dichlorophenyl)-carbamide-4-hydroxy-3,5-dibromobenzaldoxime (VI). The preparation of the active agent was produced by the same method as that specified in Example 1. It was sprayed onto the plot of plants so that the plants were just dew moist.

All the plants withered completely within 10 days and did not recover again afterwards.

The preparation and melting points of some of the compounds of the instant invention are illustrated, without limitation, by the following examples.

EXAMPLE 3

(XII) 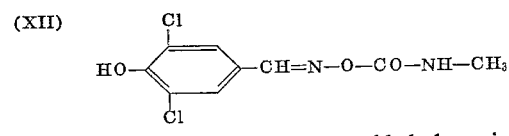

6.5 g. methyl isocyanate are added dropwise at 20° C. to a suspension of 23 g. 4-hydroxy-3,5-dichlorobenzaldoxime in 100 ml. methylene chloride. After stirring at room temperature for one day, the product is filtered off with suction, washed with a little methylene chloride and dried in vacuo at 30° C. 21.7 g. of N-methyl-carbamide-4-hydroxy-3,5-dichlorobenzaldozime are obtained. Melting point: 120–122° C. (from ethyl acetate).

EXAMPLE 4

(IX′) 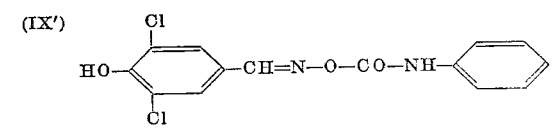

A suspension of 20.6 g. 4-hydroxy - 3,5 - dichlorobenzaldoxime in 100 ml. benzene is treated with 10.9 g. phenyl - isocyanate. A weakly exothermal reaction occurs. After standing overnight, the product is filtered off with suction, washed with a little methylene chloride and dried in vacuo at 30° C. 28.2 g. of N-phenyl-carbamide-4-hydroxy-3,5-dichlorobenzaldoxime are obtained. Melting point: 146–149° C. (decomposition).

EXAMPLE 5

(X′) 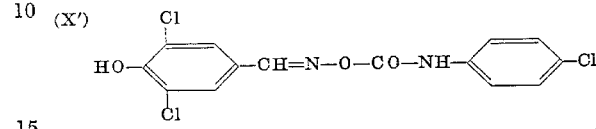

A suspension of 117 g. 4-hydroxy-3,5-dichlorobenzaldoxime in 500 ml. methylene chloride is treated at 20° C. with a solution of 88 g. 4-chlorophenyl isocyanate in 200 ml. methylene chloride. When the weakly exothermal reaction has subsided and after stirring has been continued for several hours, the product is filtered off with suction, washed with a little methylene chloride and dried in vacuo at 30° C. 192 g. of N-(4′-chlorophenyl)-carbamide - 4-hydroxy-3,5-dichlorobenzaldoxime are obtained. Melting point: 176–179° C. (decomposition).

EXAMPLE 6

(III″) 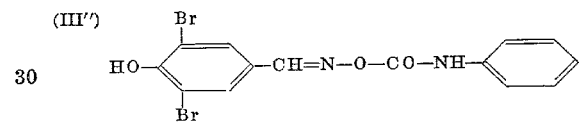

8 ml. phenyl isocyanate are added dropwise at 20° C. to a suspension of 17.7 g. 4-hydroxy-3,5-dibromobenzaldoxime in 100 ml. methylene chloride. After stirring has been continued for 7 hours, the product is filtered off with suction, washed with a little methylene chloride and dried in air. 22 g. of N-phenyl-carbamide-4-hydroxy-3,5-dibromobenzaldoxime are obtained. Melting point: 161° C. (decomposition).

EXAMPLE 7

(XI′) 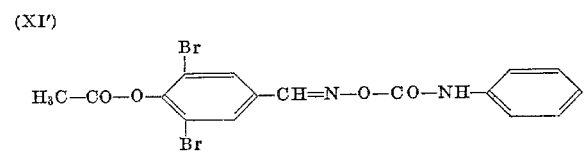

20.7 g. of the compound described in Example 6 are suspended in 28.5 ml. acetic anhydride by stirring and treated with 1 g. triethylene diamine. The temperature automatically rises from 20° C. to 36° C., a clear solution is formed temporarily and the reaction product is then precipitated. After half an hour, the mixture is stirred with 500 ml. of water, and the product is filtered off with suction, washed with water and dried in vacuo over potassium hydroxide. 18.3 g. of N-phenyl-carbamide-4-acetyloxy - 3,5-dibromobenzaldoxime are obtained as shiny small leaves after recrystallization from 80 ml. benzene. Melting point: 145–148° C.

EXAMPLE 8

(XIII) 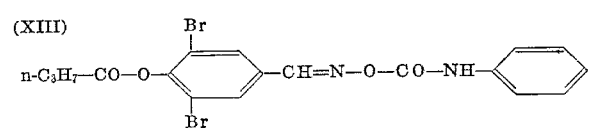

1 g. triethylene diamine is added to a stirred suspension of 20.7 g. of the compound described in Example 6 in 24.5 ml. n-butyric anhydride. During this operation, the temperature rises from 20° to 29° C., and the reaction product crystallizes out after a solution has formed temporarily. After one hour, the mixture is treated with an equal amount of benzene, and the product is filtered off with suction and washed with ice cooled benzene. 17.7 g. of N-phenyl-carbamide-4-n-butyryloxy-3,5-dibromobenzaldoxime are obtained, and 16.85 g. of needles after recrystallization from 60 ml. benzene. Melting point: 149–151° C.

EXAMPLE 9

(XIV)

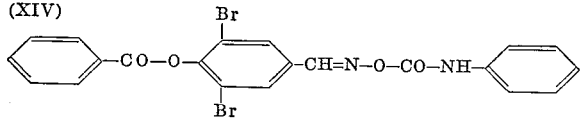

2.1 ml. pyridine are added to a suspension of 10.1 g. of the compound described in Example 6 in 80 ml. diethyl ether, and a solution of 2.9 ml. benzoyl chloride in 20 ml. diethyl ether is than added dropwise while stirring. The temperature rises to 25° C. After stirring for several hours, the product is filtered off with suction and washed with ether; after drying, 11.2 g. of N-phenyl-carbamide-4-benzoyloxy - 3,5 - dibromobenzaldoxime are obtained. Melting point: 158–162° C.

EXAMPLE 10

(V′)

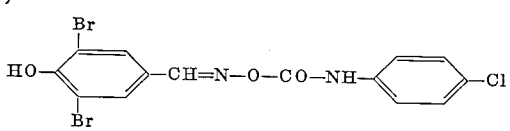

A solution of 8 g. 4-chlorophenyl isocyanate in 20 ml. methylene chloride is added dropwise to a suspension of 14.8 g. 4-hydroxy-3,5-dibromobenzaldoxime in 100 ml. methylene chloride. After stirring for 7 hours, the product is filtered off with suction, washed with methylene chloride and dried in air. 20.5 g. of N-(4′-chlorophenyl) - carbamide - 4 - hydroxy-3,5-dibromobenzaldoxime are obtained. Melting point: 172–175° C. (decomposition).

EXAMPLE 11

(VI′)

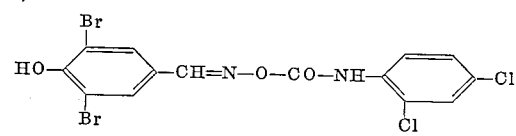

14.8 g. 4-hydroxy-3,5-dibromobenzaldoxime are suspended in 100 ml. methylene chloride and a solution of 10 g. 3,4-dichlorophenyl isocyanate in 30 ml. methylene chloride is added dropwise at 20° C. After stirring has been continued for three hours and after standing overnight, the product is filtered off with suction, washed with methylene chloride and dried in vacuo. 20.4 g. of N-(3′,4′ - dichlorophenyl) - carbamide - 4 - hydroxy-3,5-dibromobenzaldoxime are obtained. Melting point: 154–157° C. (decomposition).

EXAMPLE 12

(VII′)

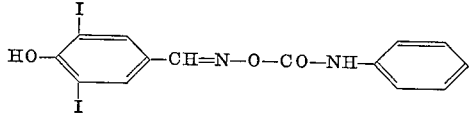

A suspension of 15.6 g. 4-hydroxy-3,5-diiodobenzaldoxime in 100 ml. chloroform is stirred at 20° C for 6 hours with 5 ml. phenyl isocyanate. The product is filtered off with suction, the filtrate is evaporated down to ⅓ of its original volume, and altogether 18.7 g. of N-phenyl-carbamide-4-hydroxy - 3,5 - diiodobenzaldoxime are obtained. Melting point: 150–152° C. (decomposition).

EXAMPLE 13

(VIII′)

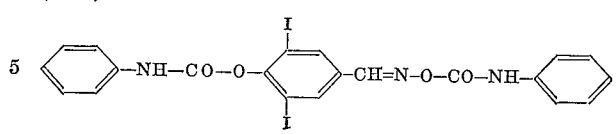

0.5 ml. triethylamine are added to a suspension of 16.5 g. 4-hydroxy-3,5-diiodobenzaldoxime in 150 ml. methylene chloride and 10 ml. phenyl isocyanate are then added dropwise. The temperature automatically rises from 20 to 28° C. and a thick pulp is temporarily formed, which then becomes less viscous again. After four hours, the product is filtered off with suction, washed with a little methylene chloride, and after it has been dried in vacuo 15 g. of N-phenyl-carbamide-4-(N′-phenyl-carbamoyloxy)-3,5-diiodobenzaldoxime are obtained. Melting point: 153–155° C. (decomposition).

EXAMPLE 14

(IV′)

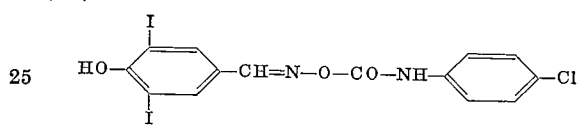

A solution of 8 g. 4-chlorophenyl isocyanate in 20 ml. methylene chloride is added dropwise at 20° C. to a suspension of 15.6 g. 4-hydroxy-3,5-diiodobenzaldoxime in 100 ml. methylene chloride. After stirring for six hours, the product is filtered off with suction, washed with methylene chloride and dried in air. 19 g. of N-(4′-chlorophenyl)-carbamide - 4 - hydroxy-3,5-diiodobenzaldoxime are obtained. Melting point: 133–134° C. (decomposition).

EXAMPLE 15

(XV)

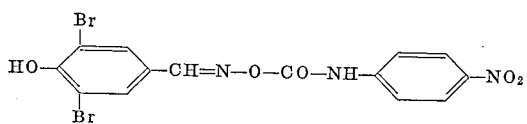

A solution of 16.4 g. 4-nitrophenyl isocyanate in 50 ml. methylene chloride is added to a suspension of 29.5 g. 4-hydroxy - 3,5 - dibromo-benzaldoxime in 150 ml. methylene chloride. After stirring at 20° C. has been continued for 6 hours, the product is filtered off with suction, washed with methylene chloride and dried in air. 42.9 g. of almost colorless N-(4′-nitrophenyl)-carbamide-4 - hydroxy-3,5-dibromobenzaldoxime of decomposition point 167–168° C. are obtained, which turns yellow in the light.

EXAMPLE 16

(XVI)

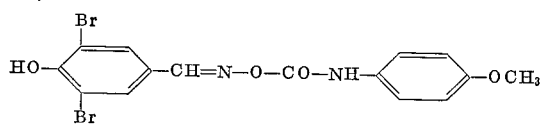

41.6 g. 4-hydroxy-3,5-dibromobenzaldoxime in 210 ml. methylene chloride are stirred at room temperature for 6 hours with 21 g. 4-methoxy-phenyl isocyanate. 52.0 g. of N-(4′-methoxy-phenyl)-carbamide - 4 - hydroxy-3,5-dibromobenzaldoxime of decomposition point 148–150° C. are obtained.

EXAMPLE 17

(XVII)

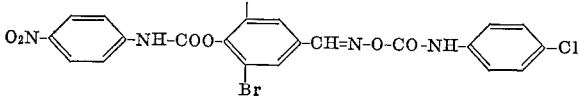

22.5 g. of the compound described in Example 10 are suspended in 125 ml. methylene chloride and after the addition of 0.5 ml. tin octoate, it is treated with a solution of 11.6 g. 4-nitrophenyl isocyanate in 25 ml. methylene chloride. After stirring at 20° C. has been continued for 5 hours, the product is filtered off with suction, washed with methylene chloride and dried in air. 30.7 g. of almost colorless N-(4'-chlorophenyl) - carbamide-4-[N'-(4"-nitrophenyl) - carbamoyloxy] - 3,5 - dibromobenzaldoxime of M.P. 154–159° C. (decomposition) are obtained, which turns brilliant yellow in light.

EXAMPLE 18

(XVIII) 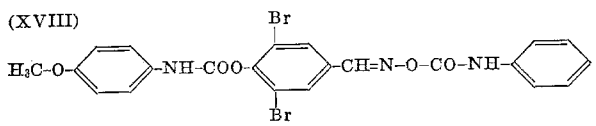

27 g. of the compound described in Example 6 in 125 ml. methylene chloride are treated with 11 g. 4-methoxyphenyl isocyanate and 0.5 ml. tin octoate. After stirring has been continued for 5 hours, the product is filtered off with suction, washed with methylene chloride and dried in air. 33.8 g. of N-phenyl-carbamide-4-[N'-(4'-methoxyphenyl) - carbamoyloxy] - 3,5 - dibromobenzaldoxime of decomposition point 154–156° C. are obtained.

EXAMPLE 19

(XIX) 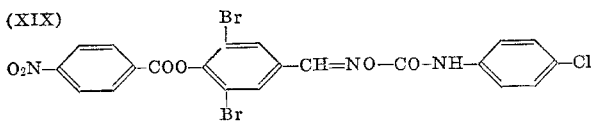

26.9 g. of the compound described in Example 10 are suspended in 200 ml. of pure diethyl ether and after the addition of 5 ml. pyridine, it is treated with a solution of 12.0 g. p-nitrobenzoyl chloride in 80 ml. of pure ether. After stirring has been continued for 4 hours, the product is filtered off with suction, washed first with ether and thereafter with water, and dried in vacuo over KOH. 31.3 g. of crude N-(4'-chlorophenyl)-carbamide-4[(4"-nitro benzoyloxy] - 3,5 - dibromobenzaldoxime are obtained, which melts at 180–199° C. with decomposition after it has been recrystallized from 50 ml. dimethylformamide/250 ml. methanol.

EXAMPLE 20

(XX) 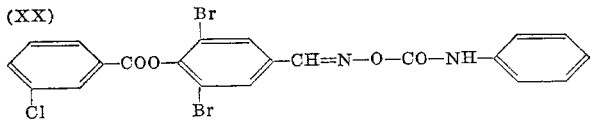

20.7 g. of the compound described in Example 6 are suspended in 200 ml. of pure diethyl ether and after the addition of 4.8 ml. Pyridine, it is treated dropwise with 11.4 g. m-chlorobenzoyl chloride. After stirring has been continued for 2 hours, the product is filtered off with suction, washed first with ether and thereafter with water, and dried in air. 26.2 g. of N-phenyl-carbamide-4-[3'-chloro)benzoyloxy] - 3,5 - dibromobenzaldoxime of M.P. 174–175° C. (decomposition) are obtained (from dimethylformamide/methanol).

EXAMPLE 21

(XXI) 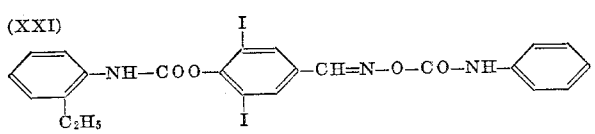

9 g. 2-ethylphenyl isocyanate and 0.3 ml. tin octoate are added to a suspension of 25.4 g. of the compound described in Example 12 in 150 ml. methylene chloride. After stirring for 6 hours, the product is filtered off with suction, washed with methylene chloride and dried in air. 27.8 g. of N-phenylcarbamide-4-[N'-(2'-ethylphenyl)carbamoyloxy]-3,5-diiodobenzaldoxime of M.P. 156–159° C. (decmoposition) are obtained.

EXAMPLE 22

(XXII) 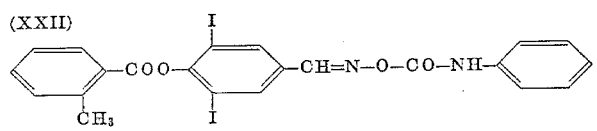

A suspension of 25.4 g. of the compound described in Example 12 in 200 ml. of pure diethyl ether is treated with 4.8 ml. pyridine and thereafter dropwise with 10 g. o-toluoyl chloride. After stirring has been continued for 3 hours, the product is filtered off with suction, washed first with ether and thereafter with water, and dried in vacuo over KOH. 26.5 g. of N-phenyl-carbamide-4-[(2'-methyl)benzoyloxy]-3,5-diiodobenzaldoxime of decomposition point 175–176° C. are obtained (from dimethylformamide/methanol).

EXAMPLE 23

(XXIV) 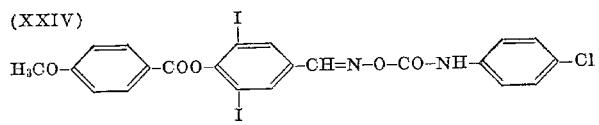

4.8 ml. pyridine are added to a suspension of 27.1 g. of the compound described in Example 14 in 200 ml. of pure diethyl ether and thereafter dropwise 11.1 g. p-methoxybenzoyl chloride. After stirring has been continued for 2 hours, the product is filtered off with suction, washed first with ether and thereafter with water, and dried in vacuo over KOH. 28.6 g. of N-(4'-chlorophenyl)-carbamide - 4 - [(4" - methoxy)benzoyloxy]-3,5-diiodobenzaldoxime of decomposition point 177–195° C. are obtained (from dimethylformamide/methanol), which turns yellow in the light.

EXAMPLE 24

(XXIV) 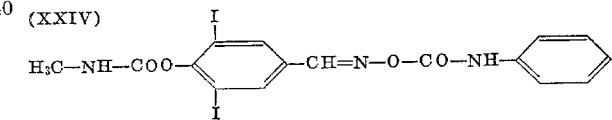

25.4 g. of compound described in Example 12 in 150 ml. methylene chloride are treated with 5.7 g. methyl isocyanate and 0.5 ml. tin octoate. When the weakly exothermal reaction has subsided, the mixture is diluted with 300 ml. methylene chloride and stirring at 20° C. is continued for another 7 hours. The product is filtered off with suction, washed with methylene chloride and dried in air, and 26.2 g. of N-phenyl-carbamide-4-(N'-methylcarbamoyloxy)-3,5-diiodobenzaldoxime of M.P. 177–178° C. (decomposition) are obtained.

EXAMPLE 25

In accordance with the procedure of the foregoing examples, using corresponding molar amounts of:
 (a) 4 - hydroxy-3-chloro-5-bromo-benzaldoxime and tert.-butyl isocyanate, which are reacted according to the procedure of Example 3;
 (b) N - (2' - bromo-4'-isopropyl-6'-nitro-phenyl)-carbamide - 4 - hydroxy-3-chloro-5-iodo-benzaldoxime (prepared by the procedure of Example 10) and 3-chloro-4-nitro-5-iodo-benzoyl chloride, which are reacted according to the procedure of Example 9; and
 (c) N - (3' - iodo-4'-ethoxy-5'-fluoro-phenyl)carbamide-4-hydroxy-3-iodo-5-bromo-benzaldoxime (prepared by the procedure of Example 10) and 2-bromo-3-ethoxy-4-iodo-phenyl isocyanate, which are reacted according to the procedure of Example 17; the following particular benzaldoxime compounds, respectively, are formed:
 (a') N - tert. - butyl - carbamide - 4 - hydroxy - 3-chloro-5-bromobenzaldoxime;

(b′) N - (2′ - bromo-4′-isopropyl-6′-nitro-phenyl)-carbamide - 4 - [(3″-chloro-4″-nitro-5″-iodo)benzoyloxy]-3-chloro-5-iodo-benzaldoxime; and (c) N-(3′-iodo-4′-ethoxy-5′-fluoro-phenyl)-carbamide-4-[N′-(2″-bromo - 3″ - ethoxy-4″-iodo-phenyl)-carbamoyl-oxy]-3-iodo-5-bromo-benzaldoxime.

Generally, in accordance with the present invention, in the foregoing formulae:

each X respectively represents chloro, bromo or iodo;
$R_1$ represents hydrogen or the radical —$COR_3$, or the radical —$CONHR_3$, wherein $R_3$ is defined herein below; and
$R_2$ and $R_3$ each respectively represents alkyl having 1 to 4 carbon atoms such as methyl, ethyl, n-propyl, isopropyl, n-butyl, isobutyl, sec.-butyl, tert.-butyl, and the like, especially alkyl having 1 to 2 carbon atoms in the case of $R_2$, i.e., methyl and ethyl; or phenyl; or substituted phenyl which is substituted correspondingly with halo such as chloro, bromo, iodo and fluoro, including mono-, di-, poly- and mixed chloro, bromo, iodo and fluoro, especially chloro, bromo and iodo, and most especially chloro; or with nitro; or with alkyl having 1 to 4 carbon atoms such as methyl, ethyl, n-propyl, isopropyl, n-butyl, isobutyl, sec.-butyl, tert.-butyl, and the like, especially alkyl having 1 to 2 carbon atoms; or with alkoxy having 1 to 4 carbon atoms such as methoxy, ethoxy, n-propoxy, isopropoxy, n-butoxy, isobutoxy, sec.-butoxy, tert.-butoxy, and the like, especially alkoxy having 1 to 2 carbon atoms; or with mixtures of such halo, nitro, alkyl and alkoxy substituents.

In particular, where $R_1$ is the radical —$COR_3$, such radical contemplates, for instance, alkanoyl having 1 to 5 carbon atoms (i.e.,

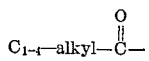

such as acetyl, propionyl, butanoyl (i.e., butyryl), pentanoyl, and the like; benzoyl; halobenzoyl such as mono-, di-, poly- and mixed choloro-, bromo-, iodo-, and fluoro--benzoyl; nitrobenzoyl; methyl- to tert.-butyl- (i.e., $C_{1-4}$ alkyl inclusive) benzoyl, especially methyl- and ethylbenzoyl; methoxy- to tert.-butoxy- (i.e., $C_{1-4}$ alkoxy inclusive) benzoyl, especially methoxy- and ethoxy-benzoyl; and mixed halo-, nitro-, methyl- to tert.-butyl-, and methoxy- to tert.-butoxy- substituted benzoyl; and Where $R_1$ is the radical —$CONHR_3$, such radical contemplates, for instance, N-ankyl carbamoyl having 1 to 4 carbon atoms in the alkyl moiety, such as N-methyl- to N-tert.-butyl- (i.e., $C_{1-4}$ alkyl inclusive) carbamoyl; N-phenyl carbamoyl; N-halo-phenyl carbamyl; N-nitrophenyl carbamyl; N-methyl- to tert.-butyl- (i.e., $C_{1-4}$ alkyl inclusive) -phenyl carbamyl; N-methoxy- to tert.-butoxy- (i.e., $C_{1-4}$ alkoxy inclusive) -phenyl carbamoyl; and di-, poly- and mixed -halo-, -nitro-, -methyl- to tert.-butyl- (i.e., $C_{1-4}$ alkyl inclusive), and -methoxy- to tert.-butoxy- (i.e., $C_{1-4}$ alkoxy inclusive) substituted N-phenyl carbamyl or carbamoyl (i.e.,—NHCO—).

All of the foregoing compounds contemplated by the present invention possess the desired total and selective herbicidal properties, and especially the capability of selectively destroying weeds, particularly in cereal cultivation. It will be realized that the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question, especially weeds in cereal cultivation.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. N-substituted carbamide-dihalo-benzaldoxime having the formula

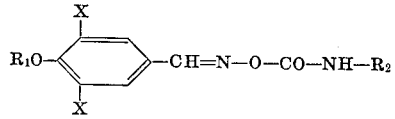

in which each X respectively is selected from the group consisting of chloro, bromo and iodo, $R_1$ is selected from the group consisting of hydrogen, —$COR_3$ and —$CONHR_3$, and $R_2$ and $R_3$ each respectively is selected from the group consisting of alkyl having 1 to 4 carbon atoms, phenyl, and substituted phenyl which is substituted with a substituent selected from the group consisting of halo, nitro, alkyl having 1 to 4 carbon atoms, alkoxy having 1 to 4 carbon atoms, and mixtures of such substituents.

2. Benzaldoxime according to claim 1 wherein $R_1$ is hydrogen and $R_2$ is selected from the group consisting of alkyl having 1 to 2 carbon atoms, phenyl, and substituted phenyl which is substituted with a substituent selected from the group consisting of chloro, bromo, iodo, nitro, methyl, ethyl, methoxy, ethoxy, and mixtures of such substituents.

3. Benzaldoxime according to claim 1 wherein such compound is N-phenyl-carbamide-4-hydroxy-3,5-dibromo-benzaldoxime having the formula

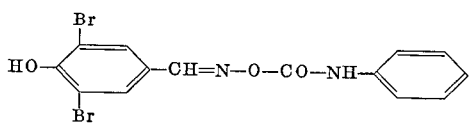

4. Benzaldoxime according to claim 1 wherein such compound is N-(4′ - chlorophenyl)-carbamide-4-hydroxy-3,5-diiodo-benzaldoxime having the formula

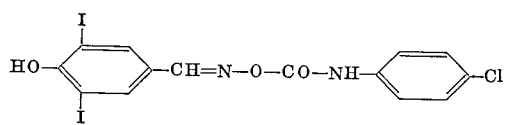

5. Benzaldoxime according to claim 1 wherein such compound is N-phenyl-carbamide-4-(N′-phenyl-carbamoyloxy)-3,5-diiodo-benzaldoxime having the formula

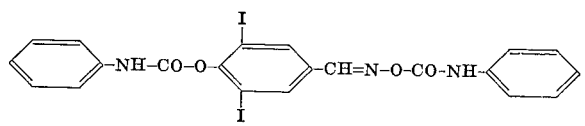

6. Benzaldoxime according to claim 1 wherein such compound is N-(4′-chlorophenyl)-carbamide-4-hydroxy-3,5-dichloro-benzaldoxime having the formula

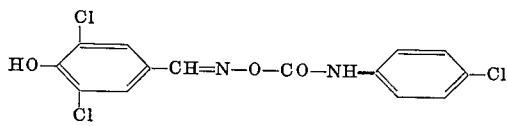

7. Benzaldoxime according to claim 1 wherein such compound is N-phenyl-carbamide-4-acetyloxy - 3,5-dibromobenzaldoxime having the formula

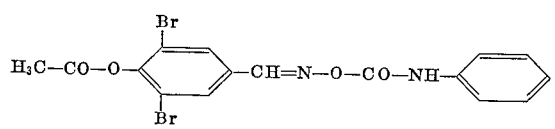

8. Benzaldoxime according to claim 1 wherein such compound is N-methyl-carbamide - 4-hydroxy-3,5-dichlorobenzaldoxime having the formula

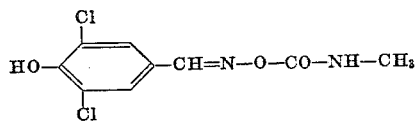

9. Benzaldoxime according to claim 1 wherein such compound is N-phenyl-carbamide - 4-benzoyloxy-3,5-dibromobenzaldoxime having the formula

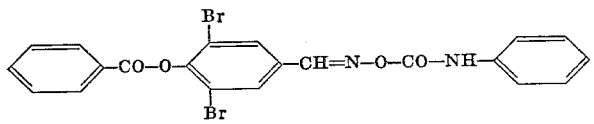

10. Benzaldoxime according to claim 1 wherein such compound is N-(4'-nitrophenyl)-carbamide-4-hydroxy-3,5-dibromo-benzaldoxime having the formula

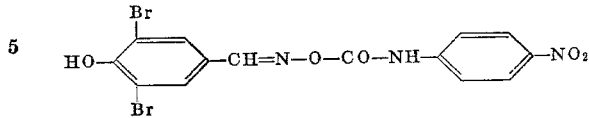

References Cited

FOREIGN PATENTS 1,174,757  4/1964  Germany.

LORRAINE A. WEINBERGER, Primary Examiner

L. ARNOLD THAXTON, Assistant Examiner

U.S. Cl. X.R.

71—121, 106; 260—477, 479, 566, 473

PO-1050
(5/69)

UNITED STATES PATENT OFFICE
CERTIFICATE OF CORRECTION

Patent No. 3,492,333     Dated January 27, 1970

Inventor(s) KARLFRIED DICKORE, KLAUS SASSE, LUDWIG EUE and HELMUTH HACK

It is certified that error appears in the above-identified patent and that said Letters Patent are hereby corrected as shown below:

Column 3, line 2, "benzeldoximes" should be --benzaldoximes--; column 3, line 39, "Formulate" should be --Formulae--; column 3, line 65, "triethylmine" should be --triethylamine--; column 9, line 16, "than" should be --then--; column 9, lines 42-49, Formula (VI') should be:

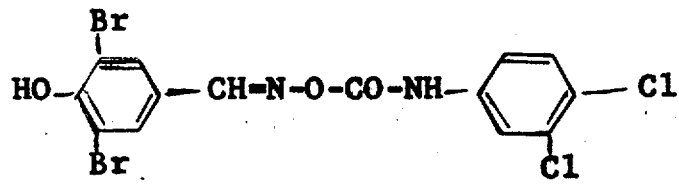

column 11, line 75, "decmoposition" should be --decomposition--; column 12, line 46, "of compound" should be --of the compound--; column 13, line 11, "$R_3$ is defined" should be --$R_3$ is as defined--; column 13, line 47, "N-ankyl" should be --N-alkyl--

SIGNED AND
SEALED
JUN 3 0 1970

(SEAL)
Attest:

Edward M. Fletcher, Jr.
Attesting Officer

WILLIAM E. SCHUYLER, JR.
Commissioner of Patents